(12) United States Patent
Yamawaki (10) Patent No.: US 12,258,737 B2
(45) Date of Patent: Mar. 25, 2025

(54) WORK MACHINE, MEASUREMENT METHOD, AND SYSTEM

(71) Applicant: KOMATSU LTD., Tokyo (JP)

(72) Inventor: Shota Yamawaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/773,270

(22) PCT Filed: Dec. 2, 2020

(86) PCT No.: PCT/JP2020/044793
§ 371 (c)(1),
(2) Date: Apr. 29, 2022

(87) PCT Pub. No.: WO2021/124880
PCT Pub. Date: Jun. 24, 2021

(65) Prior Publication Data
US 2024/0159022 A1    May 16, 2024

(30) Foreign Application Priority Data
Dec. 16, 2019    (JP) .................................. 2019-226408

(51) Int. Cl.
*E02F 3/43*    (2006.01)
*E02F 9/26*    (2006.01)

(52) U.S. Cl.
CPC .............. *E02F 9/264* (2013.01); *E02F 3/431* (2013.01)

(58) Field of Classification Search
CPC ................................ E02F 9/264; E02F 3/431
See application file for complete search history.

(56) References Cited

U.S. PATENT DOCUMENTS

| | | |
|---|---|---|
| 2009/0187527 A1 | 7/2009 | Mcaree et al. |
| 2010/0161185 A1 | 6/2010 | Marathe et al. |
| 2015/0284931 A1 | 10/2015 | Tsukamoto |
| 2017/0131134 A1 | 5/2017 | Kang |
| 2018/0051445 A1 | 2/2018 | Hori et al. |
| 2018/0274210 A1 | 9/2018 | Nishimura et al. |
| 2018/0364091 A1 | 12/2018 | Godsey |
| 2019/0284783 A1* | 9/2019 | Moriki .................... E02F 9/261 |
| 2020/0131739 A1* | 4/2020 | Ueda ....................... E02F 3/283 |
| 2020/0173144 A1* | 6/2020 | Ito ........................... F02D 29/00 |
| 2020/0277753 A1* | 9/2020 | Roh ......................... E02F 9/264 |

FOREIGN PATENT DOCUMENTS

| | | |
|---|---|---|
| CN | 203373804 U | 1/2014 |
| CN | 106836366 A | 6/2017 |
| CN | 107130660 A | 9/2017 |
| CN | 108291387 A | 7/2018 |
| CN | 109281345 A | 1/2019 |
| CN | 109680738 A | 4/2019 |

(Continued)

*Primary Examiner* — Stephen Holwerda (74) *Attorney, Agent, or Firm* — Faegre Drinker Biddle & Reath LLP (57) ABSTRACT

A boom is attached to a machine main body. A bucket is attached to the boom. A boom cylinder is attached to the machine main body and drives the boom. A bucket cylinder is attached to the machine main body and drives the bucket with respect to the boom. A controller calculates a mass of a load within the bucket based on boom cylinder force and bucket cylinder force.

17 Claims, 7 Drawing Sheets

(56) References Cited

FOREIGN PATENT DOCUMENTS

| | | | |
|---|---|---|---|
| CN | 110374163 A | 10/2019 | |
| CN | 110431388 A | 11/2019 | |
| JP | S60-082595 A | 5/1985 | |
| JP | H05-086636 A | 4/1993 | |
| JP | H07-252091 A | 10/1995 | |
| JP | H10-245874 A | 9/1998 | |
| JP | 2012-103029 A | 5/2012 | |
| JP | 2012-220216 A | 11/2012 | |
| JP | 2014-173949 A | 9/2014 | |
| JP | 2015-158049 A | 9/2015 | |
| JP | 2017-008633 A | 1/2017 | |
| JP | 2019-066310 A | 4/2019 | |
| WO | WO-2019065391 A1 * | 4/2019 | ............ E02F 3/283 |
| WO | WO-2019189503 A1 * | 10/2019 | ............ E02F 3/435 |

\* cited by examiner

WORK MACHINE, MEASUREMENT METHOD, AND SYSTEM

TECHNICAL FIELD

The present disclosure relates to a work machine, a measurement method, and a system.

BACKGROUND ART

For example, Japanese Patent Laying-Open No. 2017-8633 (see PTL 1) discloses a method of estimating a loaded weight within a bucket in a work machine such as a wheel loader. In PTL 1, in order to estimate the loaded weight within the bucket, a list in which relation between a boom angle and a bottom pressure is defined is used. This list shows relation between a boom angle and a bottom pressure in each of a state that the bucket is unloaded, a state that a rated weight is loaded, and a state that a load at a prescribed ratio of the rated weight is loaded.

CITATION LIST

Patent Literature

PTL 1: Japanese Patent Laying-Open No. 2017-8633

SUMMARY OF INVENTION

Technical Problem

With the method of estimating a loaded weight in PTL 1, when a load having a weight other than the weight in the state shown in the list is loaded in the bucket, the loaded weight cannot accurately be estimated.

An object of the present disclosure is to provide a work machine, a measurement method, and a system, with which a mass of a load within a bucket can accurately be estimated.

Solution to Problem

A work machine according to the present disclosure includes a machine main body, a boom, a bucket, a first actuator, a second actuator, and a controller. The boom is attached to the machine main body. The bucket is attached to the boom. The first actuator is attached to the machine main body and drives the boom. The second actuator is attached to the machine main body and drives the bucket with respect to the boom. The controller calculates a mass of a load within the bucket based on thrust of the first actuator and thrust of the second actuator.

A measurement method according to the present disclosure is a measurement method of measuring a mass of a load within a bucket in a work machine. The work machine includes a machine main body, a boom attached to the machine main body, a bucket attached to the boom, a first actuator attached to the machine main body, the first actuator driving the boom, and a second actuator attached to the machine main body, the second actuator driving the bucket with respect to the boom. The measurement method includes steps below.

Information on thrust of the first actuator is obtained. Information on thrust of the second actuator is obtained. A mass of a load within the bucket is calculated based on the information on thrust of the first actuator and the information on thrust of the second actuator.

A system according to the present disclosure includes a machine main body, a boom, a bucket, a first actuator, and a second actuator. The boom is attached to the machine main body. The bucket is attached to the boom. The first actuator is attached to the machine main body and drives the boom. The second actuator is attached to the machine main body and drives the bucket with respect to the boom. A mass of a load within the bucket is calculated based on thrust of the first actuator and thrust of the second actuator.

Advantageous Effects of Invention

According to the present disclosure, a work machine, a measurement method, and a system, with which a mass of a load within a bucket can accurately be estimated, can be realized.

DESCRIPTION OF EMBODIMENTS

An embodiment of the present disclosure will be described below in detail with reference to the drawings. In the specification and the drawings, the same or corresponding components have the same reference characters allotted and redundant description will not be repeated. For the sake of description, features may not be shown or may be simplified in the drawings. At least a part of an embodiment and a modification may arbitrarily be combined.

First Embodiment

<Construction of Work Machine>

A construction of a wheel loader will be described with reference to FIG. 1 as an exemplary work machine according to the present embodiment. The work machine in the present embodiment is not limited to the wheel loader. The work machine in the present embodiment should only be a work machine with wheels that carries out excavation while it travels, and a backhoe loader or a skid-steer loader may be applicable.

Figure 1:
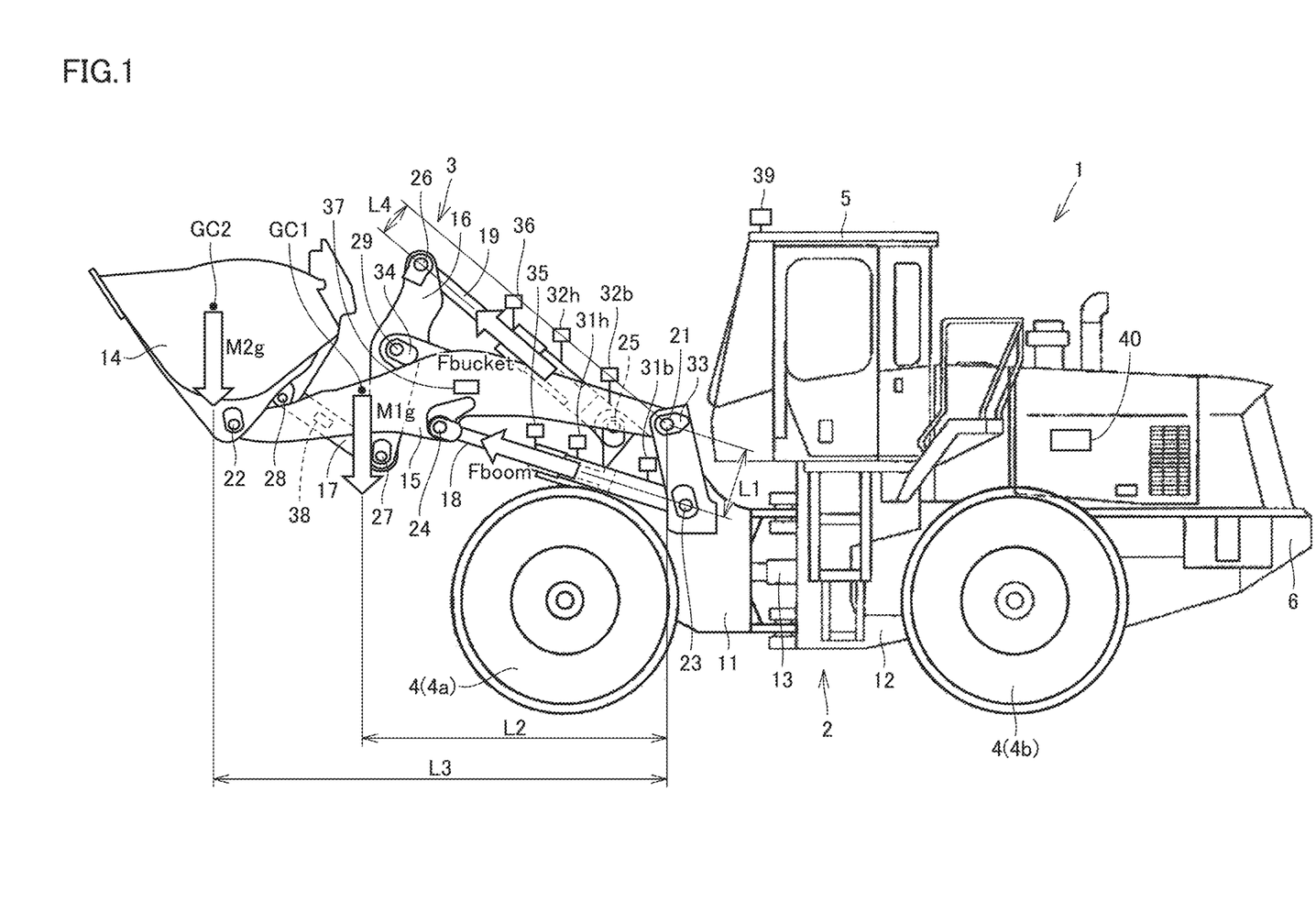
FIG. 1 is a side view of a wheel loader as an exemplary work machine according to a first embodiment.

FIG. 1 is a side view of a wheel loader as an exemplary work machine according to a first embodiment. As shown in FIG. 1, a wheel loader 1 includes a vehicular body frame 2, a work implement 3, a traveling unit 4, and a cab 5.

A machine main body of wheel loader 1 is composed of vehicular body frame 2 and cab 5. In cab 5, a seat where an operator sits and an operation apparatus are arranged. Work implement 3 and traveling unit 4 are attached to the machine main body of wheel loader 1. Work implement 3 is arranged in front of the machine main body and a counterweight 6 is provided at a rearmost end of the machine main body.

Vehicular body frame 2 includes a front frame 11 and a rear frame 12. A steering cylinder 13 is attached to front frame 11 and rear frame 12. Steering cylinder 13 is a hydraulic cylinder. Steering cylinder 13 extends and contracts by hydraulic oil from a steering pump (not shown). As steering cylinder 13 extends and contracts, front frame 11 and rear frame 12 can swing with respect to each other in a lateral direction. A direction of travel of wheel loader 1 can thus laterally be changed.

A direction in which wheel loader 1 travels straight is herein referred to as a forward/rearward direction of wheel loader 1. In the forward/rearward direction of wheel loader 1, a side on which work implement 3 is arranged with respect to vehicular body frame 2 is defined as a forward direction, and a side opposite to the forward direction is defined as a rearward direction. A lateral direction of wheel loader 1 is a direction orthogonal to the forward/rearward direction in a plan view. When looking in the forward direction, a right side and a left side in the lateral direction are a right direction and a left direction, respectively. An upward/downward direction of wheel loader 1 is a direction orthogonal to a plane defined by the forward/rearward direction and the lateral direction. In the upward/downward direction, a side on which the ground is present is a lower side and a side on which the sky is present is an upper side.

Traveling unit 4 includes running wheels 4a and 4b. Each of running wheels 4a and 4b is a wheel and includes a tire made of rubber. Running wheel (front wheel) 4a is rotatably attached to front frame 11. Running wheel (rear wheel) 4b is rotatably attached to rear frame 12. Wheel loader 1 can be self-propelled as running wheels 4a and 4b are rotationally driven.

Work implement 3 serves to do such works as excavation. Work implement 3 is attached to front frame 11. Work implement 3 includes a bucket 14, a boom 15, a bell crank 16, a tilt rod 17, a boom cylinder 18 (a first actuator), and a bucket cylinder 19 (a second actuator).

Boom 15 has a base end rotatably attached to front frame 11 with a boom pin 21 being interposed. Boom 15 is thus rotatably attached to the machine main body. Bucket 14 is rotatably attached to a tip end of boom 15 with a bucket pin 22 being interposed.

Boom cylinder 18 drives boom 15. Boom cylinder 18 has one end rotatably attached to front frame 11 of the machine main body with a pin 23 being interposed. Boom cylinder 18 is thus rotatably attached to the machine main body. Boom cylinder 18 has the other end rotatably attached to boom 15 with a pin 24 being interposed.

Boom cylinder 18 is, for example, a hydraulic cylinder. Boom cylinder 18 extends and contracts by hydraulic oil from a work implement pump (not shown). Boom 15 is thus driven and bucket 14 attached to the tip end of boom 15 is moved upward and downward.

Bell crank 16 is rotatably supported on boom 15 by a support pin 29. Bell crank 16 has a first end located on one side of support pin 29 and a second end located opposite to the first end with respect to support pin 29. Bell crank 16 has the first end connected to bucket 14 with tilt rod 17 being interposed. Bell crank 16 has the second end connected to front frame 11 of the machine main body with bucket cylinder 19 being interposed.

Tilt rod 17 has one end rotatably attached to the first end of bell crank 16 with a pin 27 being interposed. Tilt rod 17 has the other end rotatably attached to bucket 14 with a pin 28 being interposed.

Bucket cylinder 19 drives bucket 14 with respect to boom 15. Bucket cylinder 19 has one end (a third end) and the other end (a fourth end) opposite to one end. Bucket cylinder 19 has one end rotatably attached to front frame 11 of the machine main body with a pin 25 being interposed. Bucket cylinder 19 has the other end rotatably attached to the second end of bell crank 16 with a pin 26 being interposed.

Bucket cylinder 19 is, for example, a hydraulic cylinder. Bucket cylinder 19 extends and contracts by hydraulic oil from a work implement pump (not shown). Bucket 14 is thus driven and pivots upward and downward with respect to boom 15.

Wheel loader 1 further includes a sensor that senses information on thrust $F_{boom}$ (boom cylinder force) of boom cylinder 18 and a sensor that senses information on thrust $F_{bucket}$ (bucket cylinder force) of bucket cylinder 19.

The sensor that senses information on thrust of boom cylinder 18 is, for example, pressure sensors 31b and 31h. Each of pressure sensors 31b and 31h senses a cylinder pressure of boom cylinder 18. Pressure sensor 31b senses a bottom pressure of boom cylinder 18. Pressure sensor 31h senses a head pressure of boom cylinder 18.

The head pressure means a pressure on a cylinder rod side with respect to a piston of a hydraulic cylinder and a bottom pressure means a pressure on a tube side with respect to the piston.

The sensor that senses information on thrust of bucket cylinder 19 is, for example, pressure sensors 32b and 32h. Each of pressure sensors 32b and 32h senses a cylinder pressure of bucket cylinder 19. Pressure sensor 32b senses a bottom pressure of bucket cylinder 19. Pressure sensor 32h senses a head pressure of bucket cylinder 19.

Wheel loader 1 further includes a sensor that senses information on an attitude of work implement 3. The sensor that senses information on the attitude of work implement 3 includes, for example, a first sensor that senses information on a boom angle and a second sensor that senses information on a bucket angle with respect to the boom.

The information on the attitude of work implement 3 refers to a dimension L1 and a dimension L4. Dimension L1 is a dimension between boom pin 21 and pin 23, in a direction orthogonal to a direction of extension of boom cylinder 18. Dimension L4 is a dimension between boom pin 21 and pin 26, in a direction orthogonal to a direction of extension of bucket cylinder 19.

The boom angle refers to an angle of boom 15 with respect to front frame 11 of the machine main body The bucket angle refers to an angle of bucket 14 with respect to boom 15.

The first sensor that senses information on the boom angle is, for example, a potentiometer 33. Potentiometer 33 is attached as being concentric with boom pin 21. Instead of potentiometer 33, a stroke sensor 35 of boom cylinder 18 may be employed as the first sensor that senses information on the boom angle.

An inertial measurement unit (IMU) 37 or an image pick-up device (for example, a camera) 39 may be employed as the first sensor that senses information on the boom angle.

IMU 37 is attached, for example, to boom 15. Image pick-up device 39 is attached to the machine main body (for example, cab 5).

The second sensor that senses information on the bucket angle is, for example, a potentiometer 34. Potentiometer 34 is attached as being concentric with support pin 29. Instead of potentiometer 34, a stroke sensor 36 of bucket cylinder 19 may be employed as the second sensor that senses information on the bucket angle.

An IMU 38 or image pick-up device 39 may be employed as the second sensor that senses information on the bucket angle. IMU 38 is attached, for example, to tilt rod 17.

Potentiometers 33 and 34, stroke sensors 35 and 36, IMUs 37 and 38, and image pick-up device 39 may be used as a sensor that senses information on a position of a center of gravity GC1 of work implement 3. Information on the position of center of gravity GC1 of work implement 3 is a dimension L2.

Dimension L2 is dimension L2 between center of gravity GC1 and boom pin 21, along the forward/rearward direction of wheel loader 1. Dimension L2 is a dimension along a horizontal direction between center of gravity GC1 and boom pin 21 while wheel loader 1 is placed on a horizontal ground.

Potentiometers 33 and 34, stroke sensors 35 and 36, IMUs 37 and 38, and image pick-up device 39 may be used as the sensor that senses information on a position of a center of gravity GC2 of a load within bucket 14. Information on the position of center of gravity GC2 of the load within bucket 14 is a dimension L3.

Dimension L3 is dimension L3 between center of gravity GC2 and boom pin 21, along the forward/rearward direction of wheel loader 1. Dimension L3 is a dimension along the horizontal direction between center of gravity GC2 and boom pin 21 while wheel loader 1 is placed on the horizontal ground.

Wheel loader 1 may further include an angle sensor 40. Angle sensor 40 senses an angle of inclination (a pitch angle) of the machine main body with respect to a direction (a horizontal plane) perpendicular to a direction of gravity which is defined as the reference. For example, an IMU attached to the machine main body may be employed as angle sensor 40. Angle sensor 40 may be attached to any of front frame 11, rear frame 12, and cab 5 so long as it is attached to the machine main body.

<Functional Block of Controller>

A functional block of controller 50 that measures a mass of a load within bucket 14 of work machine 1 shown in FIG. 1 will now be described with reference to FIG. 2.

Figure 2:
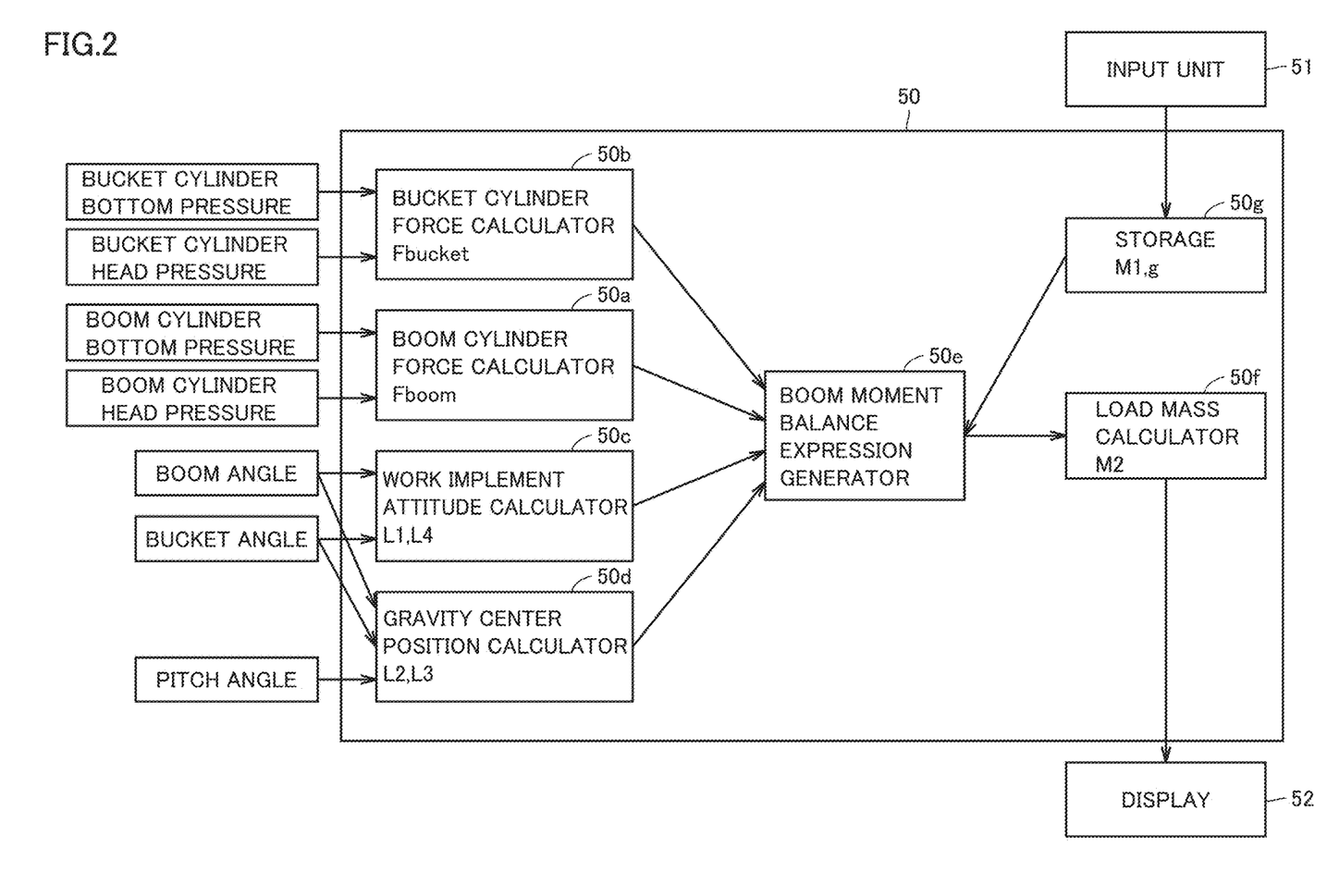
FIG. 2 is a diagram showing a functional block of a controller that measures a mass of a load within a bucket in the work machine according to the first embodiment.

FIG. 2 is a diagram showing a functional block of the controller that measures a mass of a load within the bucket in the work machine shown in FIG. 1. As shown in FIG. 2, controller 50 includes a boom cylinder force calculator 50*a*, a bucket cylinder force calculator 50*b*, a work implement attitude calculator 50*c*, a gravity center position calculator 50*d*, a boom moment balance expression generator 50*e*, a load mass calculator 50*f*, and a storage 50*g*.

Boom cylinder force calculator 50*a* calculates boom cylinder force $F_{boom}$ based on cylinder pressures sensed by pressure sensors 31*b* and 31*h*. Specifically, boom cylinder force calculator 50*a* calculates boom cylinder force $F_{boom}$ based on a bottom pressure of boom cylinder 18 obtained from pressure sensor 31*b* and a head pressure obtained from pressure sensor 31*h*. Boom cylinder force calculator 50*a* may calculate boom cylinder force $F_{boom}$ only from the obtained bottom pressure of boom cylinder 18. Boom cylinder force calculator 50*a* provides calculated boom cylinder force $F_{boom}$ to boom moment balance expression generator 50*e*.

Bucket cylinder force calculator 50*b* calculates bucket cylinder force $F_{bucket}$ based on cylinder pressures sensed by pressure sensors 32*b* and 32*h*. Specifically, bucket cylinder force calculator 50*b* calculates bucket cylinder force $F_{bucket}$ based on a bottom pressure of bucket cylinder 19 obtained from pressure sensor 32*b* and a head pressure obtained from pressure sensor 32*h*. Bucket cylinder force calculator 50*b* may calculate bucket cylinder force $F_{bucket}$ only from the obtained bottom pressure of bucket cylinder 19. Bucket cylinder force calculator 50*b* provides calculated bucket cylinder force $F_{bucket}$ to boom moment balance expression generator 50*e*.

Work implement attitude calculator 50*c* obtains information on the boom angle from the first sensor (potentiometer 33, stroke sensor 35, IMU 37, or image pick-up device 39). Work implement attitude calculator 50*c* obtains information on the bucket angle from the second sensor (potentiometer 34, stroke sensor 36, IMU 38, or image pick-up device 39).

Work implement attitude calculator 50*c* calculates dimension L1 and dimension L4 based on the information on the boom angle and the information on the bucket angle. Work implement attitude calculator 50*c* provides calculated dimensions L1 and L4 to boom moment balance expression generator 50*e*.

Gravity center position calculator 50*d* obtains information on the boom angle from the first sensor (potentiometer 33, stroke sensor 35, IMU 37, or image pick-up device 39). Gravity center position calculator 50*d* obtains information on the bucket angle from the second sensor (potentiometer 34, stroke sensor 36, IMU 38, or image pick-up device 39).

Gravity center position calculator 50*d* calculates dimension L2 and dimension L3 based on the information on the boom angle and the information on the bucket angle. Gravity center position calculator 50*d* provides calculated dimensions L2 and L3 to boom moment balance expression generator 50*e*.

In storage 50*g*, a mass M1 of the entire work implement 3 and an acceleration of gravity g are stored. Information such as mass M1 or acceleration of gravity g may be provided to storage 50*g* through an input unit 51 outside controller 50. Storage 50*g* may be arranged outside controller 50, rather than being included in controller 50.

Boom moment balance expression generator 50*e* obtains mass M1 of the entire work implement 3 and acceleration of gravity g from storage 50*g*.

Boom moment balance expression generator 50*e* generates a boom moment balance expression (1) based on obtained cylinder forces $F_{boom}$ and $F_{bucket}$, dimensions L1 to L4, masses M1 and M2, and acceleration of gravity g.

[Expression 1]

$$F_{boom} \times L1 + F_{bucket} \times L4 = M1 g \times L2 + M2 g \times L3 \quad (1)$$

In the expression (1), cylinder force $F_{boom}$ or $F_{bucket}$ is expressed in the unit N, dimensions L1 to L4 are expressed in the unit in, masses M1 and M2 are expressed in the unit kg, and acceleration of gravity g is expressed in the unit m/s$^2$.

Boom moment balance expression generator 50*e* provides the expression (1) to load mass calculator 50*f*.

Load mass calculator 50*f* solves the expression (1) with respect to mass M2 as shown in an expression (2) below. Load mass calculator 50*f* can thus calculate mass M2 of the load within bucket 14.

[Expression 2]

$$M2 = \frac{F_{boom} \times L1 + F_{bucket} \times L4 - M1g \times L2}{g \times L3} \quad (2)$$

As shown in the expression (2), controller 50 calculates M2 based on boom cylinder force $F_{boom}$, bucket cylinder force $F_{bucket}$, dimensions L1 to L4, mass M1, and acceleration of gravity g.

Load mass calculator 50f provides calculated mass M2 to a display 52 outside controller 50. Display 52 may be arranged, for example, in cab 5 (FIG. 1) or at a remote location distant from wheel loader 1. Display 52 shows on a screen, calculated mass M2 or a weight M2×g. An operator who operates wheel loader 1 in cab 5 or a monitoring person who monitors an operation of wheel loader 1 at a remote location can thus recognize a mass M2 of a load within bucket 14 or a load weight M2×g.

Each of input unit 51 and display 52 may be connected to controller 50 through a wire or wirelessly.

In the expression (1), mass M2 of the load within bucket 14 is calculated totally for the entire work implement 3. As shown in an expression (3) below, however, a moment of an individual component such as bucket 14, boom 15, and bell crank 16 may be calculated and the moments may be summed.

[Expression 3]

$$M1g \times L2 = M_{boom}g \times L_{boom} + M_{bellcrank}g \times L_{bellcrank} + \quad (3)$$

In this case, M1g×L2 in the expression (2) is substituted with M1g×L2 in the expression (3). Mass M2 of the load within bucket 14 is thus similarly calculated.

<Method of Measuring Load Mass M2>

Figure 3:
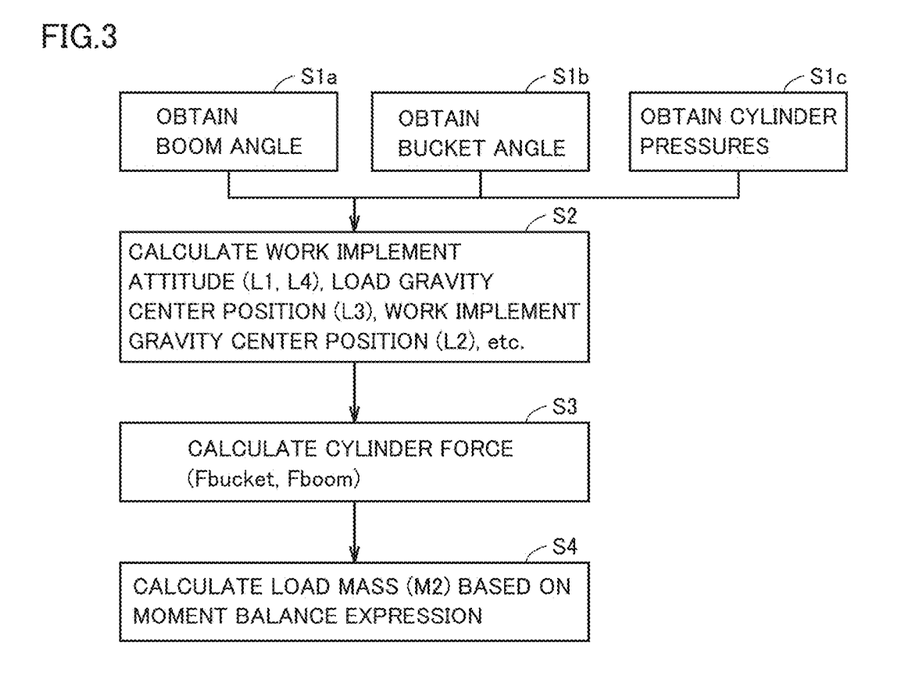
FIG. 3 is a flowchart showing a measurement method of measuring a mass of a load within the bucket in the work machine according to the first embodiment.

A method of measuring load mass M2 according to the present embodiment will now be described with reference to FIGS. 1 to 3. FIG. 3 is a flowchart showing one exemplary measurement method of measuring a mass of a load within the bucket in the work machine according to the first embodiment.

Initially, the first sensor measures information on the boom angle. For example, potentiometer 33 shown in FIG. 1 measures information on the boom angle. Potentiometer 33 measures an angle of rotation of boom 15 with respect to front frame 11 of the machine main body.

Information on the boom angle may be a stroke length of boom cylinder 18 measured by stroke sensor 35. Alternatively, information on the boom angle may be an angle (or an angular velocity) and an acceleration along three axes of boom 15 measured by IMU 37 or an image picked up by image pick-up device 39.

Controller 50 shown in FIG. 2 obtains information on the boom angle measured by the first sensor as above (step S1a: FIG. 3).

The second sensor measures information on the bucket angle. For example, potentiometer 34 shown in FIG. 1 measures information on the bucket angle. Potentiometer 34 measures an angle of rotation of bell crank 16 with respect to boom 15.

Information on the bucket angle may be a stroke length of bucket cylinder 19 measured by stroke sensor 36. Alternatively, information on the bucket angle may be an angle (or an angular velocity) and an acceleration along three axes of tilt rod 17 measured by IMU 38 or an image picked up by image pick-up device 39.

Controller 50 shown in FIG. 2 obtains information on the bucket angle measured by the second sensor as above (step S1b: FIG. 3).

In addition, a cylinder pressure is measured. The cylinder pressure is a cylinder pressure of each of boom cylinder 18 and bucket cylinder 19 shown in FIG. 1. Pressure sensor 31b measures the bottom pressure of boom cylinder 18 and pressure sensor 31h measures the head pressure thereof. Pressure sensor 32b measures the bottom pressure of bucket cylinder 19 and pressure sensor 32h measures the head pressure thereof.

Controller 50 shown in FIG. 2 obtains a plurality of cylinder pressures measured as above (step S1c: FIG. 3).

Thereafter, controller 50 calculates dimensions L1 and L4 associated with the attitude of work implement 3, dimension L3 representing the position of center of gravity GC2 of the load, and dimension L2 representing the position of center of gravity GC1 of work implement 3 based on obtained information on the boom angle and information on the bucket angle (step S2: FIG. 3).

Work implement attitude calculator 50c in FIG. 2 calculates each of dimensions L1 and L4. Gravity center position calculator 50d in FIG. 2 calculates dimensions L2 and L3.

Controller 50 further calculates boom cylinder force $F_{boom}$ and bucket cylinder force $F_{bucket}$ based on the obtained cylinder pressures (step S3: FIG. 3). Boom cylinder force calculator 50a in FIG. 2 calculates boom cylinder force $F_{boom}$. Bucket cylinder force calculator 50b in FIG. 2 calculates bucket cylinder force $F_{bucket}$.

Thereafter, controller 50 calculates mass M2 of the load within bucket 4 (step S4: FIG. 3). Load mass M2 is calculated by substituting dimensions L1 to L4 and cylinder forces $F_{bucket}$ and $F_{boom}$ calculated above and mass M1 of the entire work implement 3 and acceleration of gravity g stored in the storage in FIG. 2 into the expression (2). Load mass calculator 50f in FIG. 2 calculates load mass M2.

Controller 50 calculates mass M2 of the load within bucket 14 as above.

The order of calculation of dimensions L1 to L4 (step S2) and calculation of cylinder forces $F_{boom}$ and $F_{bucket}$ (step S3) is not limited to the order shown in FIG. 3. Calculation of dimensions L1 to L4 (step S2) may be performed after calculation of cylinder forces $F_{boom}$ and $F_{bucket}$ (step S3). Alternatively, calculation of dimensions L1 to L4 (step S2) and calculation of cylinder forces $F_{boom}$ and $F_{bucket}$ (step S3) may simultaneously be performed.

<Functions and Effects>

Functions and effects of the present embodiment will now be described with reference to FIG. 4.

Figure 4:
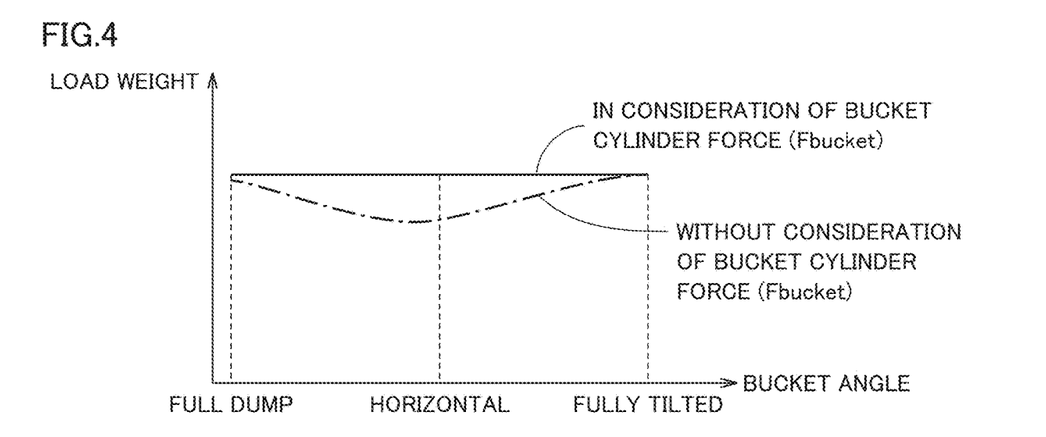
FIG. 4 is a diagram showing relation between a bucket angle and a load weight when bucket cylinder force $F_{bucket}$ is taken into consideration and when it is not taken into consideration in measurement of a mass of a load within the bucket.

FIG. 4 is a diagram showing relation between a bucket angle and a load mass when bucket cylinder force $F_{bucket}$ is taken into consideration and when it is not taken into consideration in measurement of a mass of a load within the bucket.

As shown in FIG. 4, when a load weight is calculated without consideration of bucket cylinder force $F_{bucket}$, the load weight calculated between a full dump state and a fully tilted state varies as shown with a chain dotted line in spite of the fact that there is no actual variation in load within bucket 14. This may be because the position of bucket 14 with respect to boom 15 varies and hence force applied to boom cylinder 18 and bucket cylinder 19 varies, and accordingly reaction force of each cylinder is varied. Thus, when the load weight is calculated without consideration of bucket cylinder force $F_{bucket}$, the load weight cannot accurately be calculated except for a case in which bucket 14 is in the fully tilted state.

A tilted state of bucket 14 means such a state that bucket 14 pivots with respect to boom 15 such that a front end of bucket 14 is raised as compared with a dump state. The fully tilted state means such a state that the front end of bucket 14 is raised until bucket 14 is stopped by a tilt-side stopper. The full dump state means such a state that the front end of bucket 14 is moved down until bucket 14 is stopped by a dump-side stopper.

While bucket 14 is in the full dump state, the load within bucket 14 is actually ejected from bucket 14. FIG. 4 shows a result of calculation, with an example in which the load is not ejected from the inside of bucket 14 even when bucket 14 is in the full dump state being assumed.

In contrast, in the present embodiment, load mass M2 is calculated based on boom cylinder force $F_{boom}$ and bucket cylinder force $F_{bucket}$. Thus, in calculating load mass M2, not only cylinder force $F_{boom}$ but also bucket cylinder force $F_{bucket}$ is also taken into consideration. Therefore, even when the position of bucket 14 with respect to boom 15 varies, load mass M2 can accurately be calculated as shown with a solid line in FIG. 4.

As above, accuracy of load mass M2 is improved at every angle of bucket 14 with respect to boom 15. Therefore, accuracy of load mass M2 in what is called a tip-off operation in which an amount of load within the bucket is adjusted in final travel to and from a dump truck or the like and the amount is checked in real time is improved.

In the present embodiment, not only boom cylinder force $F_{boom}$ but also bucket cylinder force $F_{bucket}$ is also included in the moment balance expression as shown in the expression (2). Therefore, calibration for correcting influence by the angle of bucket 14 after the mass of the load within bucket 14 is once calculated is not required. Thus, mass M2 of the load within bucket 14 can easily and accurately be calculated.

In the present embodiment, bucket cylinder force $F_{bucket}$ is calculated based at least on the bottom pressure of bucket cylinder 19 measured by pressure sensor 32b. Therefore, bucket cylinder force $F_{bucket}$ can directly be calculated.

Second Embodiment

In the first embodiment, calculation of bucket cylinder force $F_{bucket}$ based on the measured cylinder pressure of bucket cylinder 19 is described. Bucket cylinder force $F_{bucket}$, however, may be calculated based on a dimension of each component of work implement 3. In a second embodiment, an example for calculation of bucket cylinder force $F_{bucket}$ based on a dimension of each component of work implement 3 will be described below.

<Functional Block of Controller>

A functional block of the controller according to the present embodiment will be described with reference to FIGS. 5 and 6.

Figure 5:
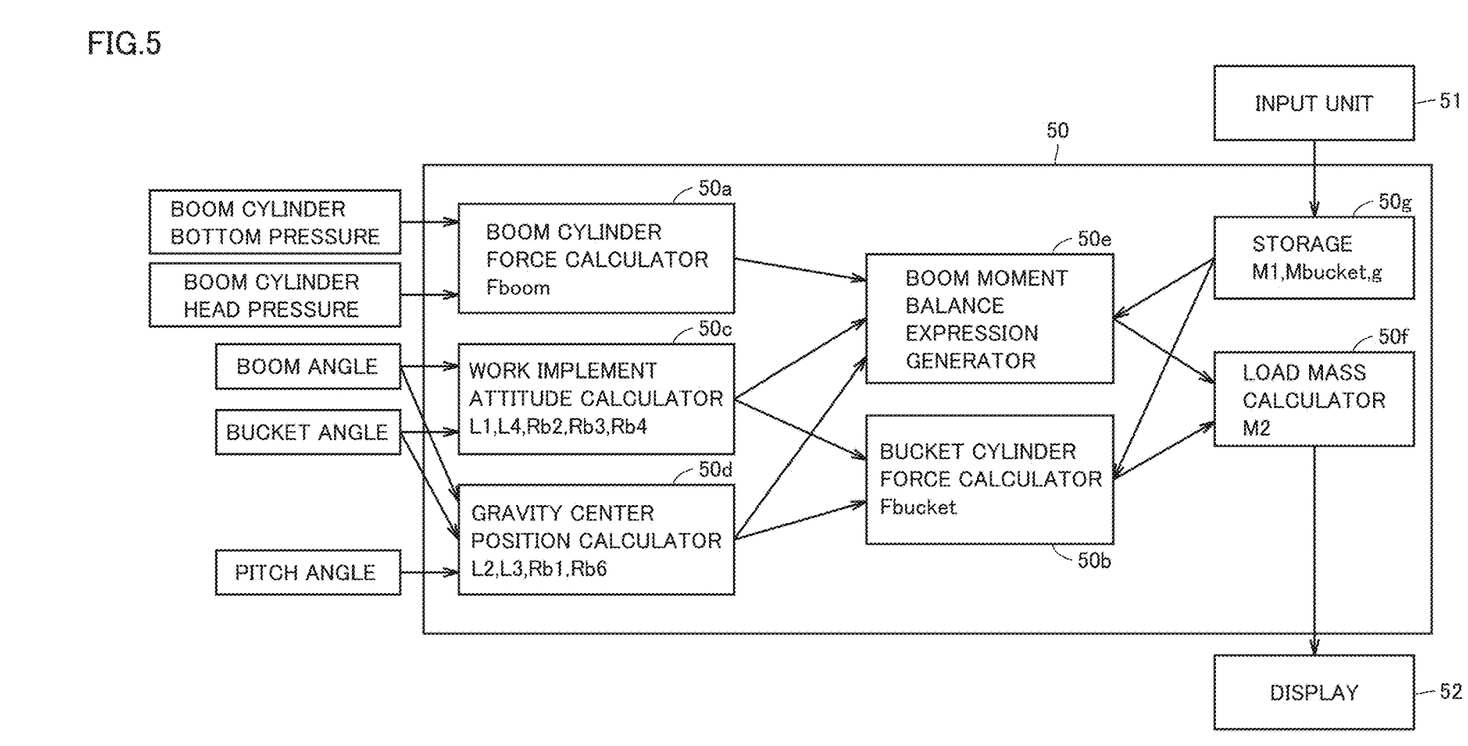
FIG. 5 is a diagram showing a functional block of the controller that measures a mass of a load within the bucket in the work machine according to a second embodiment.

FIG. 5 is a diagram showing a functional block of the controller that measures a mass of a load within the bucket in the work machine according to the second embodiment. FIG. 6 is a diagram for illustrating a dimension of each component of the work implement.

As shown in FIG. 5, controller 50 in the present embodiment includes boom cylinder force calculator 50a, bucket cylinder force calculator 50b, work implement attitude calculator 50c, gravity center position calculator 50d, boom moment balance expression generator 50e, load mass calculator 50f, and storage 50g.

Boom cylinder force calculator 50a calculates boom cylinder force $F_{boom}$ and provides boom cylinder force $F_{boom}$ to boom moment balance expression generator 50e as in the first embodiment.

Work implement attitude calculator 50c calculates dimensions L1 and L4 as in the first embodiment. Work implement attitude calculator 50c provides calculated dimensions L1 and L4 to each of boom moment balance expression generator 50e and bucket cylinder force calculator 50b.

Figure 6:
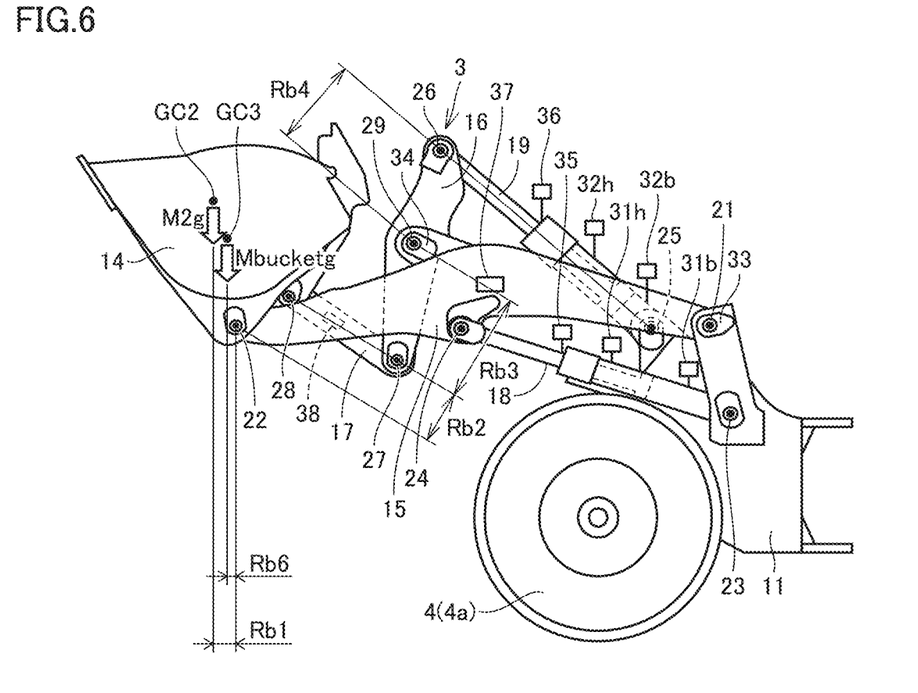
FIG. 6 is a diagram for illustrating a dimension of each component of a work implement.

Work implement attitude calculator 50c calculates dimensions Rb2, Rb3, and Rb4 shown in FIG. 6 based on information on the boom angle and information on the bucket angle.

The first sensor senses the information on the boom angle as in the first embodiment. The information sensed by the first sensor includes an angle of rotation of boom 15 measured by potentiometer 33, a stroke length of boom cylinder 18 measured by stroke sensor 35, an angle (or an angular velocity) and an acceleration along three axes of boom 15 measured by IMU 37, or an image picked up by image pick-up device 39.

The second sensor senses the information on the bucket angle as in the first embodiment. The information sensed by the second sensor is an angle of rotation of bell crank 16 measured by potentiometer 34, a stroke length of bucket cylinder 19 measured by stroke sensor 36, an angle (or an angular velocity) and an acceleration along three axes of tilt rod 17 measured by IMU 38, or an image picked up by image pick-up device 39.

As shown in FIG. 6, dimension Rb2 is a dimension between pin 22 and pin 27, in the direction orthogonal to the direction of extension of tilt rod 17. Dimension Rb3 is a dimension between pin 27 and support pin 29, in the direction orthogonal to the direction of extension of tilt rod 17. Dimension Rb4 is a dimension between pin 26 and support pin 29, in the direction orthogonal to the direction of extension of bucket cylinder 19.

As shown in FIG. 5, work implement attitude calculator 50c provides calculated dimensions Rb2, Rb3, and Rb4 to each of boom moment balance expression generator 50e and bucket cylinder force calculator 50b.

Gravity center position calculator 50d calculates dimensions L2 and L3 as in the first embodiment. Gravity center position calculator 50d provides calculated dimensions L2 and L3 to each of boom moment balance expression generator 50e and bucket cylinder force calculator 50b.

Gravity center position calculator 50d calculates dimensions Rb1 and Rb6 shown in FIG. 6 based on the information on the boom angle sensed by the first sensor and the information on the bucket angle sensed by the second sensor.

As shown in FIG. 6, dimension Rb1 is a dimension between center of gravity GC2 of the load and pin 22, along the forward/rearward direction of wheel loader 1. Dimension Rb2 is a dimension between a center of gravity GC3 of bucket 14 and pin 22, along the forward/rearward direction of wheel loader 1.

Dimension Rb1 is the dimension along the horizontal direction between center of gravity GC2 of the load and pin 22 while wheel loader 1 is placed on the horizontal ground. Dimension Rb6 is the dimension along the horizontal direction between center of gravity GC3 of bucket 14 and pin 22 while wheel loader 1 is placed on the horizontal ground.

As shown in FIG. 5, gravity center position calculator 50d provides calculated dimensions Rb1 and Rb6 to each of boom moment balance expression generator 50e and bucket cylinder force calculator 50b.

Mass M1 of the entire work implement 3, acceleration of gravity g, and a mass $M_{bucket}$ of bucket 14 are stored in storage 50g. Information such as mass M1, acceleration of gravity g, and mass $M_{bucket}$ of bucket 14 may be stored in storage 50g through input unit 51 outside controller 50.

Boom moment balance expression generator 50e generates the expression (1) as in the first embodiment and provides the expression (1) to load mass calculator 50f.

Bucket cylinder force calculator 50b obtains mass $M_{bucket}$ of bucket 14 and acceleration of gravity g from storage 50g.

Bucket cylinder force calculator 50b generates a moment balance expression (4) for bucket 14 from obtained bucket cylinder force $F_{bucket}$, dimensions Rb1 to Rb4 and Rb6, masses $M_{bucket}$ and M2, and acceleration of gravity g.

[Expression 4]

$$F_{bucket} = \frac{Rb1 \times Rb3}{Rb4 \times Rb2} \times M2g + \frac{Rb6 \times Rb3}{Rb4 \times Rb2} \times M_{bucket}g \quad (4)$$

In the expression (4), dimensions Rb1 to Rb4 and Rb6 are expressed in the unit m and mass $M_{bucket}$ is expressed in the unit kg.

As shown in the expression (4), controller 50 (bucket cylinder force calculator 50b) calculates dimensions Rb1 to Rb4 and Rb6 based on the information on the boom angle sensed by the first sensor and the information on the bucket angle sensed by the second sensor, and calculates bucket cylinder force $F_{bucket}$ based on dimensions Rb1 to Rb4 and Rb6. Bucket cylinder force calculator 50b provides the expression (4) to load mass calculator 50f.

Load mass calculator 50f calculates mass M2 by substituting $F_{bucket}$ in the expression (1) with $F_{bucket}$ in the expression (4). Load mass calculator 50f can thus calculate mass M2 of the load within bucket 14.

Since the functional block of controller 50 other than the above according to the present embodiment is substantially the same as the functional block of controller 50 according to the first embodiment, the same element has the same reference character allotted and description thereof will not be repeated.

<Method of Measuring Load Mass M2>

A method of measuring load mass M2 according to the present embodiment will now be described with reference to FIGS. 1, 3, and 5.

As shown in FIG. 3, as in the first embodiment, information on the boom angle, information on the bucket angle, and the cylinder pressure of each of boom cylinder 18 and bucket cylinder 19 are obtained (steps S1a, S1b, and S1c).

Thereafter, controller 50 calculates dimensions L1, L4, Rb2, Rb3, and Rb4 associated with the attitude of work implement 3, dimensions L3 and Rb1 in connection with center of gravity GC2 of the load, dimension Rb6 representing the position of gravity center GC3 of the bucket, and dimension L2 of center of gravity GC1 of work implement 3 based on obtained information on the boom angle and information on the bucket angle (step S2: FIG. 3).

Work implement attitude calculator 50c in FIG. 5 calculates each of dimensions L1, L4, Rb2, Rb3, and Rb4. Gravity center position calculator 50d in FIG. 5 calculates each of dimensions L2, L3, Rb1, and Rb6.

Thereafter, controller 50 calculates boom cylinder force $F_{boom}$ and bucket cylinder force $F_{bucket}$ (step S3: FIG. 3). Boom cylinder force calculator 50a in FIG. 5 calculates boom cylinder force $F_{boom}$ based on the obtained cylinder pressures. Bucket cylinder force $F_{bucket}$ is calculated in accordance with the expression (4) based on obtained dimensions Rb1 to Rb4 and Rb6. Bucket cylinder force calculator 50b in FIG. 5 calculates bucket cylinder force $F_{bucket}$.

Thereafter, controller 50 calculates mass M2 of the load within bucket 4 (step S4: FIG. 3). Mass M2 is calculated by substituting $F_{bucket}$ in the expression (1) with $F_{bucket}$ in the expression (4). Load mass calculator 50f in FIG. 5 calculates load mass M2.

Controller 50 calculates mass M2 of the load within bucket 14 as above.

<Functions and Effects>

Functions and effects of the present embodiment will now be described.

In the present embodiment as well, as in the first embodiment, load mass M2 is calculated based on boom cylinder force $F_{boom}$ and bucket cylinder force $F_{bucket}$. Therefore, even when the position of bucket 14 with respect to boom 15 varies, load mass M2 can accurately be calculated.

In the present embodiment, calibration for correcting influence by the angle of bucket 14 after the mass of the load within bucket 14 is once calculated is not required. Thus, mass M2 of the load within bucket 14 can easily and accurately be calculated.

In the present embodiment, bucket cylinder force $F_{bucket}$ is calculated based on information on the angle of boom 15 and information on the angle of the bucket. Therefore, a pressure sensor for measuring bucket cylinder force $F_{bucket}$ is not required. Therefore, in the present embodiment, the number of components can be smaller than in the first embodiment.

(Modification)

A modification of the first and second embodiments will now be described with reference to FIGS. 7 and 8.

Figure 7:
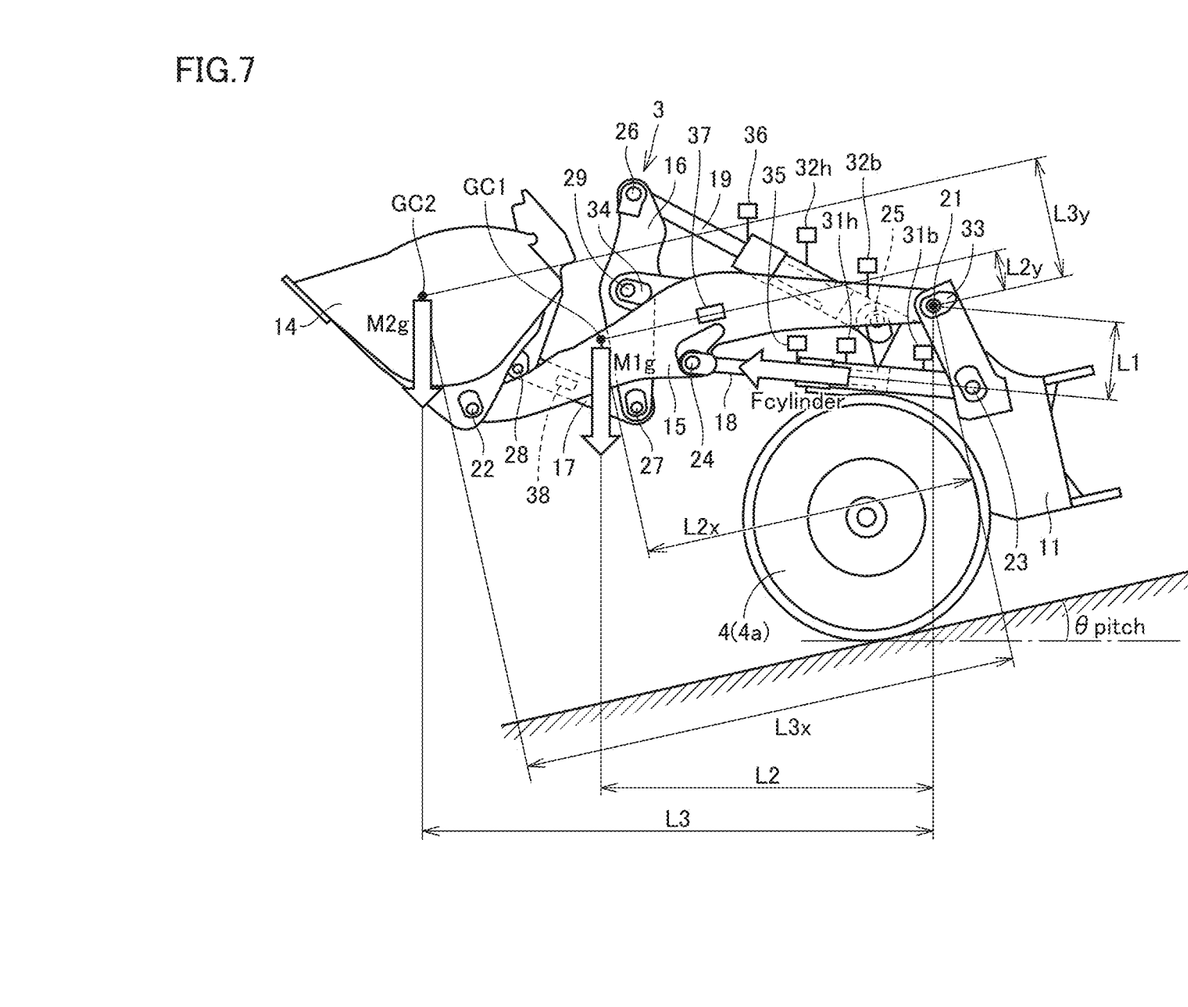
FIG. 7 is a diagram showing a state that a forward/rearward direction of the work machine is inclined with respect to a horizontal plane.
Figure 8:
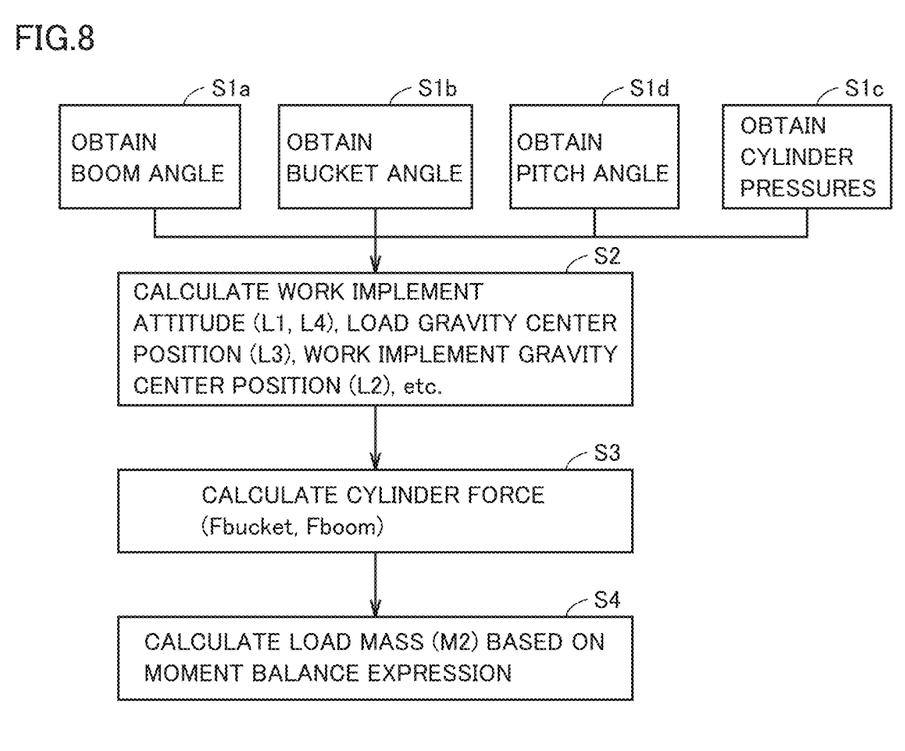
FIG. 8 is a flowchart showing a measurement method of measuring a mass of a load within the bucket when the forward/rearward direction of the work machine is inclined with respect to the horizontal plane as shown in FIG. 7.

FIG. 7 is a diagram showing a state that the forward/rearward direction of the work machine is inclined with respect to the horizontal plane. FIG. 8 is a flowchart showing a measurement method of measuring a mass of a load within the bucket when the forward/rearward direction of the work machine is inclined with respect to the horizontal plane as shown in FIG. 7.

As shown in FIG. 7, wheel loader 1 is placed on an inclined surface (the ground surface inclined with respect to the horizontal plane). Wheel loader 1 is inclined by a pitch angle $\theta_{pitch}$ in the forward/rearward direction with respect to the horizontal plane. In this case, mass M2 of the load within bucket 14 can desirably accurately be calculated without being affected by pitch angle $\theta_{pitch}$.

Then, in the present modification, pitch angle $\theta_{pitch}$ is obtained, and mass M2 of the load within bucket 14 is calculated in consideration of obtained pitch angle $\theta_{pitch}$, contents of which will specifically be described below.

As shown in FIG. 1, wheel loader 1 includes angle sensor 40 attached to the machine main body. Angle sensor 40 measures pitch angle $\theta_{pitch}$ of wheel loader 1. Angle sensor 40 should only be attached to any of front frame 11, rear frame 12, and cab 5.

As shown in FIGS. 2 and 5, controller 50 obtains measured pitch angle $\theta_{pitch}$ (step S1d: FIG. 8). Specifically, gravity center position calculator 50d of controller 50 obtains pitch angle $\theta_{pitch}$. Pitch angle $\theta_{pitch}$ is at a positive numerical value while the machine main body is inclined in such a manner that a front portion thereof is located above a rear portion thereof, and at a negative numerical value while the machine main body is inclined in such a manner that the rear portion thereof is located above the front portion thereof. Therefore, in the state shown in FIG. 7, pitch angle $\theta_{pitch}$ is at a negative numerical value.

Gravity center position calculator 50d calculates dimensions L2 and L3 in consideration of obtained pitch angle $\theta_{pitch}$ (step S2: FIG. 8). Each of dimensions L2 and L3 is calculated, for example, from expressions (5) and (6) below.

[Expression 5]

$$L2 = L2x \times \cos\theta_{pitch} + L2y \times \sin\theta_{pitch} \quad (5)$$

[Expression 6]

$$L3 = L3x \times \cos\theta_{pitch} + L3y \times \sin\theta_{pitch} \quad (6)$$

A dimension L2x (unit: m) in the expression (5) is a dimension between center of gravity GC1 of work implement 3 and boom pin 21 in a direction along the inclined surface as shown in FIG. 7. A dimension L2y (unit: m) in the expression (5) is a dimension between center of gravity GC1 of work implement 3 and boom pin 21 along a direction perpendicular to the inclined surface as shown in FIG. 7.

A dimension L3x (unit: m) in the expression (6) is a dimension between center of gravity GC2 of the load within bucket 14 and boom pin 21 in the direction along the inclined surface as shown in FIG. 7. A dimension L3y (unit: m) in the expression (6) is a dimension between center of gravity GC2 of the load within bucket 14 and boom pin 21 along the direction perpendicular to the inclined surface as shown in FIG. 7.

Dimensions L2x, L2y, L3x, and L3y in the expressions (5) and (6) are calculated based on information on the boom angle and information on the bucket angle.

In the second embodiment, gravity center position calculator 50d also calculates dimensions Rb1 and Rb6 in consideration of pitch angle $\theta_{pitch}$ similarly to dimensions L2 and L3. Each of dimensions Rb1 and Rb6 is calculated, for example, from expressions (7) and (8) below.

[Expression 7]

$$Rb1 = Rb1x \times \cos\theta_{pitch} + Rb1y \times \sin\theta_{pitch} \quad (7)$$

[Expression 8]

$$Rb6 = Rb6x \times \cos\theta_{pitch} + Rb6y \times \sin\theta_{pitch} \quad (8)$$

Thereafter, controller 50 calculates boom cylinder force $F_{boom}$ and bucket cylinder force $F_{bucket}$ based on the obtained cylinder pressures (step S3: FIG. 8). Bucket cylinder force $F_{bucket}$ may be calculated based on the measured cylinder pressures of bucket cylinder 19 as described in the first embodiment or on the dimension of each component of work implement 3 as described in the second embodiment.

Boom cylinder force calculator 50a in FIG. 2 or 5 calculates boom cylinder force $F_{boom}$. Bucket cylinder force calculator 50b in FIG. 2 or 5 calculates bucket cylinder force $F_{bucket}$.

Thereafter, controller 50 calculates mass M2 of the load within bucket 4 (step S4: FIG. 8). Load mass M2 is calculated by substituting dimensions L1 to L4 and cylinder forces $F_{bucket}$ and $F_{boom}$ calculated above and mass M1 of the entire work implement 3 and acceleration of gravity g stored in the storage in FIG. 2 or 5 into the expression (2).

At this time, controller 50 calculates mass M2 of the load within bucket 4 by using L2 and L3 calculated in the expressions (5) and (6) in the first embodiment or by using L2, L3, Rb1, and Rb6 calculated in the expressions (5) to (8) in the second embodiment.

Load mass calculator 50f in FIG. 2 or 5 calculates load mass M2.

Controller 50 calculates mass M2 of the load within bucket 14 as above.

Since the construction of the work machine and the method of calculating load mass M2 in the modification other than the above are substantially the same as in the first and second embodiments, description thereof will not be repeated.

According to the present modification, dimensions L2, L3, Rb1, and Rb6 are calculated in consideration of pitch angle $\theta_{pitch}$. Therefore, mass M2 loaded in bucket 14 can easily and accurately be calculated on every inclined ground and at every bucket angle.

Controller 50 shown in FIGS. 2 and 4 may be mounted on work machine 1 or arranged at a distance on the outside of work machine 1. When controller 50 is arranged at a distance on the outside of work machine 1, controller 50 may wirelessly be connected to sensors 31b, 31h, 32b, 32h, and 33 to 40. Controller 50 is implemented, for example, by a processor, and may be implemented by a central processing unit (CPU). A control system that controls work machine 1 is implemented by functions of controller 50.

Though a hydraulic cylinder is described as boom cylinder 18 (first actuator) above, first actuator 18 is not limited to the hydraulic cylinder. A cylinder should only generate thrust for driving boom 15, and for example, an electric cylinder may be applicable.

Though a hydraulic cylinder is described as bucket cylinder 19 (second actuator) above, second actuator 19 is not limited to the hydraulic cylinder. A cylinder should only generate thrust for driving bucket 14, and for example, an electric cylinder may be applicable.

Though pressure sensors 31b, 31h, 32b, and 32h are described as the sensors that sense information on thrust of first actuator 18 and second actuator 19, the sensor that senses information on thrust may be a sensor that senses information on thrust of an electric cylinder or the like.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 work machine (wheel loader); 2 vehicular body frame; 3 work implement; 4 traveling unit; 4a front wheel; 4b rear wheel; 5 cab; 6 counterweight; 11 front frame; 12 rear frame; 13 steering cylinder; 14 bucket; 15 boom; 16 bell crank; 17 tilt rod; 18 boom cylinder (first actuator); 19 bucket cylinder (second actuator); 21 boom pin; 22 bucket pin; 29 support pin; 31b, 31h, 32b, 32h pressure sensor; 33, 34 potentiometer; 35, 36 stroke sensor; 39 image pick-up device; 50 controller; 50a boom cylinder force calculator; 50b bucket cylinder force calculator; 50c work implement attitude calculator; 50d gravity center position calculator; 50e expression generator; 50f load mass calculator; 50g storage; 51 input unit; 52 display; GC1 work implement gravity center; GC2 load gravity center; GC3 bucket gravity center

The invention claimed is:

1. A work machine comprising:
a machine main body;
a boom attached to the machine main body with a boom pin;
a bucket attached to the boom;

a first actuator attached to the machine main body, the first actuator driving the boom;
a second actuator attached to the machine main body, the second actuator driving the bucket with respect to the boom;
a bell crank attached to the second actuator with a pin that rotates the bell crank; and
a controller that calculates a mass of a load within the bucket based on a first thrust of the first actuator and a second thrust of the second actuator,
wherein:
the first actuator is a boom cylinder and the second actuator is a bucket cylinder, and
the controller generates a balance expression including the second thrust of the bucket cylinder and a dimension between the boom pin and the pin that rotates the bell crank, the dimension being in a direction orthogonal to a direction of extension of the bucket cylinder.

2. The work machine according to claim 1, wherein
the first actuator has a first end attached to the machine main body and a second end attached to the boom, and
the first actuator is a hydraulic cylinder.

3. The work machine according to claim 1, wherein
the second actuator is a hydraulic cylinder,
the work machine further comprises a pressure sensor that senses a cylinder pressure of the second actuator, and
the controller calculates the second thrust of the second actuator based on the cylinder pressure sensed by the pressure sensor.

4. The work machine according to claim 1, wherein
the controller generates a moment balance expression associated with the boom based at least in part on the second thrust of the second actuator.

5. The work machine according to claim 1, further comprising an angle sensor that senses a pitch angle of the work machine, wherein
the controller calculates the mass of the load within the bucket in consideration of the pitch angle sensed by the angle sensor.

6. The work machine according to claim 1, wherein the bell crank includes a first end and a second end opposite to the first end, wherein
the first end is connected to the bucket,
the second actuator includes a third end and a fourth end opposite to the third end, and
the third end is attached to the machine main body and the fourth end is attached to the second end of the bell crank.

7. The work machine according to claim 1, wherein
the boom is rotatably attached to the machine main body and the bucket is rotatably attached to the boom,
the work machine further comprises:
a first sensor that senses information on an angle of the boom with respect to the machine main body;
a second sensor that senses information on an angle of the bucket with respect to the boom, and
the controller calculates the second thrust of the second actuator based on the information on the angle of the boom sensed by the first sensor and the information on the angle of the bucket sensed by the second sensor.

8. The work machine according to claim 1, further comprising a wheel attached to the machine main body.

9. The work machine according to claim 1, wherein the first actuator and the second actuator each have an end attached to the machine main body.

10. The work machine according to claim 1, wherein the controller is configured to control the first thrust of the first actuator and the second thrust of the second actuator to keep the boom in a moment balance state.

11. A measurement method of measuring a mass of a load within a bucket in a work machine, the work machine including a machine main body, a boom attached to the machine main body, the bucket attached to the boom, a first actuator attached to the machine main body, the first actuator driving the boom, and a second actuator attached to the machine main body, the second actuator driving the bucket with respect to the boom, the measurement method comprising:
obtaining, via a first sensor, information on a first thrust of the first actuator;
obtaining, via a second sensor, information on a second thrust of the second actuator; and
calculating, via a controller, a mass of a load within the bucket based on the information received from the first sensor on the first thrust of the first actuator and the information received from the second sensor on the second thrust of the second actuator,
the first actuator is a boom cylinder and the second actuator is a bucket cylinder, and
the controller generates a balance expression including thrust of the bucket cylinder and a dimension between a boom pin and a pin that rotates a bell crank, the dimension being in a direction orthogonal to a direction of extension of the bucket cylinder.

12. The measurement method according to claim 11, further comprising obtaining a pitch angle of the work machine, wherein
in the calculating a mass of a load within the bucket, the mass of the load within the bucket is calculated in consideration of the obtained pitch angle.

13. The measurement method according to claim 11, wherein the first actuator and the second actuator each have an end attached to the machine main body.

14. The measurement method according to claim 11, wherein the controller is configured to control the first thrust of the first actuator and the second thrust of the second actuator to keep the boom in a moment balance state.

15. A system comprising:
a machine main body;
a boom attached to the machine main body with a boom pin;
a bucket attached to the boom;
a first actuator attached to the machine main body, the first actuator driving the boom;
a second actuator attached to the machine main body, the second actuator driving the bucket with respect to the boom; and
a bell crank attached to the second actuator with a pin that rotates the bell crank,
wherein:
a mass of a load within the bucket is calculated based on a first thrust of the first actuator and a second thrust of the second actuator,
the first actuator is a boom cylinder and the second actuator is a bucket cylinder, and
a controller generates a balance expression including thrust of the bucket cylinder and a dimension between the boom pin and the pin that rotates the bell crank, the dimension being in a direction orthogonal to a direction of extension of the bucket cylinder.

16. The system according to claim 15, wherein the first actuator and the second actuator each have an end attached to the machine main body.

17. The system according to claim 15, wherein the controller further configured to control the first thrust of the first actuator and the second thrust of the second actuator to keep the boom in a moment balance state.

* * * * *